United States Patent
Ball et al.

(10) Patent No.: US 10,983,988 B2
(45) Date of Patent: Apr. 20, 2021

(54) DATA PIPELINE CREATION SYSTEM AND METHOD

(71) Applicant: Palantir Technologies Inc., Palo Alto, CA (US)

(72) Inventors: Eliot Ball, London (GB); Andre Frederico Cavalheiro Menck, New York, NY (US); Matthew Jenny, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 144 days.

(21) Appl. No.: 16/362,113

(22) Filed: Mar. 22, 2019

(65) Prior Publication Data
US 2020/0210408 A1  Jul. 2, 2020

(30) Foreign Application Priority Data

Dec. 27, 2018  (GB) ...................................... 1821248

(51) Int. Cl.
*G06F 7/00*  (2006.01)
*G06F 16/23*  (2019.01)
*G06F 16/22*  (2019.01)

(52) U.S. Cl.
CPC ...... *G06F 16/2379* (2019.01); *G06F 16/2255* (2019.01)

(58) Field of Classification Search
CPC .......................... G04F 16/2379; G04F 16/2255
USPC ................................................ 707/600–899
See application file for complete search history.

(56) References Cited

U.S. PATENT DOCUMENTS

| 6,857,123 | B1 | 2/2005 | Nuxoll et al. |
| 2008/0288921 | A1 | 11/2008 | Jacob et al. |
| 2009/0007081 | A1 | 1/2009 | Lau et al. |
| 2010/0262839 | A1 | 10/2010 | Eker et al. |
| 2011/0067012 | A1 | 3/2011 | Eisen et al. |
| 2011/0088011 | A1 | 4/2011 | Ouali |
| 2012/0005662 | A1 | 1/2012 | Ringseth et al. |

(Continued)

FOREIGN PATENT DOCUMENTS

| EP | 2857995 | 4/2015 |
| EP | 3336690 | 6/2018 |
| EP | 3474160 | 4/2019 |

OTHER PUBLICATIONS

Official Communication for European Patent Application No. 17196924.9 dated Feb. 27, 2018.

(Continued)

*Primary Examiner* — Isaac M Woo
(74) *Attorney, Agent, or Firm* — Sheppard Mullin Richter & Hampton LLP (57) ABSTRACT

A computer-implemented method comprises receiving one or more data transformation commands through a console in a console session, the one or more data transformation commands relating to one or more initial datasets; executing the one or more data transformation commands using the one or more initial datasets to modify at least one of the one or more initial datasets to generate a modified dataset; generating a set of environment flags for the command to indicate that the one or more initial datasets has been accessed and the at least one dataset that has been modified; and updating a set of line dependencies based on the generated set of environmental flags and previously generated sets of environmental flags for one or more previously executed commands.

14 Claims, 5 Drawing Sheets

(56) References Cited

U.S. PATENT DOCUMENTS

| | | |
|---|---|---|
| 2012/0079462 A1 | 3/2012 | Hriljac |
| 2013/0152047 A1 | 6/2013 | Moorthi et al. |
| 2014/0101641 A1 | 4/2014 | Staples et al. |
| 2014/0282625 A1 | 9/2014 | Chico de Guzman Huerta et al. |
| 2015/0363294 A1 | 12/2015 | Carback et al. |
| 2016/0344745 A1 | 11/2016 | Johnson et al. |
| 2017/0090893 A1 | 3/2017 | Aditya et al. |
| 2017/0139952 A1 | 5/2017 | Arasan et al. |
| 2017/0220334 A1 | 8/2017 | Hart et al. |
| 2018/0101583 A1 | 4/2018 | Li et al. |
| 2018/0150528 A1 | 5/2018 | Shah et al. |
| 2018/0150529 A1 | 5/2018 | McPherson et al. |
| 2018/0165072 A1 | 6/2018 | Cuthriell et al. |
| 2018/0167480 A1 | 6/2018 | Jain |
| 2019/0114335 A1 | 4/2019 | Koenig et al. |

OTHER PUBLICATIONS

Notice of Allowance for U.S. Appl. No. 15/839,680 dated Dec. 20, 2018.
Official Communication for U.S. Appl. No. 15/815,367 dated Aug. 2, 2018.
Official Communication for U.S. Appl. No. 15/839,680 dated Aug. 9, 2018.
Official Communication for European Patent Application No. 17206940.3 dated May 14, 2018.
Official Communication for European Patent Application No. 17196924.9 dated Jul. 10, 2018.

DATA PIPELINE CREATION SYSTEM AND METHOD

FIELD

This specification relates to the creation of data pipelines in a data analysis system. In particular, this specification relates to the creation of data pipelines using a console.

BACKGROUND

Increasing amounts of data are being collected and analyzed. Raw data are often in a form that is not immediately useable, and one or more transformations may be applied to the data in sequence to transform them into a more readily useable form. The set of transformation applied may be referred to as a data pipeline, i.e. a data pipeline is a dependency graph of data transformations.

Data pipelines may be difficult to create, particularly when there are multiple and/or branching transformation steps with later steps having dependencies on preceding steps.

SUMMARY

A first aspect of the specification provides a method performed by one or more processors, the method comprising: receiving one or more data transformation commands through a console in a console session, the one or more data transformation commands relating to one or more initial datasets; executing the one or more data transformation commands using the one or more initial datasets to modify at least one of the one or more initial datasets to generate a modified dataset; generating a set of environment flags for the command to indicate that the one or more initial datasets has been accessed and the at least one dataset that has been modified; and updating a set of line dependencies based on the generated set of environmental flags and previously generated sets of environmental flags for one or more previously executed commands.

Updating the set of line dependencies may comprise: determining which initial datasets were accessed during execution of the data transformation command; and for each accessed dataset, searching the previously generated sets of environmental flags to find a last previously executed command at which said accessed dataset was modified.

The method may further comprise determining which of the accessed datasets has been modified prior to generating the set of environmental flags, and optionally may comprise determining which of the accessed datasets has been modified comprises: hashing one or more of the accessed datasets after executing the data transformation command to generate current hashed values of the one or more accessed datasets; and comparing the current hashed values of the accessed one or more datasets to hashed values of the one or more initial datasets to determine which of the one or more accessed datasets was modified by the data transformation command. The one or more accessed datasets may comprise a plurality of data elements, and hashing the one or more accessed datasets may comprise summing hashes of the plurality of data elements.

The method may further comprise updating a variable access list based on the environmental flags, wherein the environmental access list comprises a set of dataset identities corresponding to one or more datasets, and an associated line number for each dataset indicating a line of the console session on which said dataset was last modified.

The list of line dependencies may be used to infer a data pipeline.

Executing the one or more data transformation commands may comprise generating a data frame.

May comprise or more of: a join operation, a filter operation, a more general column and/or row transformation; mathematical operations performed on numbers; and/or string operations performed on strings.

The one or more initial datasets may comprise: a list; a table; an object; a dictionary; a string; a number; or a file.

A second aspect of the specification provides computer program product comprising computer readable instructions that, when executed by a computer, cause the computer to perform any of the above methods.

A third aspect of the specification provides a system comprising: one or more processors; and a memory, the comprising computer readable instructions that, when executed by the one or more processors, cause the system to perform any of the above methods.

BRIEF DESCRIPTION OF THE DRAWINGS

Example embodiments will now be described by way of non-limiting example with reference to the accompanying drawings, in which.

DETAILED DESCRIPTION

Reference will now be made in detail to implementations, examples of which are illustrated in the accompanying drawings.

Data pipelines can be created, edited and managed through graphical user interfaces (GUIs) in a way that automatically accounts for previously performed transformations in a pipeline. Graphical representations of tables may be interacted with via sets of menus, icons and/or other visual indicators in order to manage data pipelines.

However, the functionality of such GUIs may be restricted. Instead, a command line interface/console interface can allow more flexible inputs and a greater range of operations to be performed on datasets. Providing command line interfaces with a method for accounting for previously performed transformations on a dataset that are relevant to an input command within the command line interface can allow data pipelines to be managed/inferred through a command line interface in an analogous way to through the graphical user interface, without sacrificing the flexibility of the command line interface.

In some embodiments, there is provided a system, method and/or apparatus for interacting with a data pipeline through a command line interface/console. The console is provided with a set of environmental flags as part of a console namespace that can be used to track which datasets have been accessed and modified through the console, and a dependency of lines of the console session on previous lines of the session (i.e. previously entered commands).

When a console command is executed (e.g. just before the command is executed or just after a command is executed), the console namespace is checked to determine if the datasets relevant to the command have been modified in the console session, and, if so, determines from the console namespace the lines of the console session that the datasets were modified on. In effect, the console namespace enables inference of data pipelines from console logs.

Figure 1:
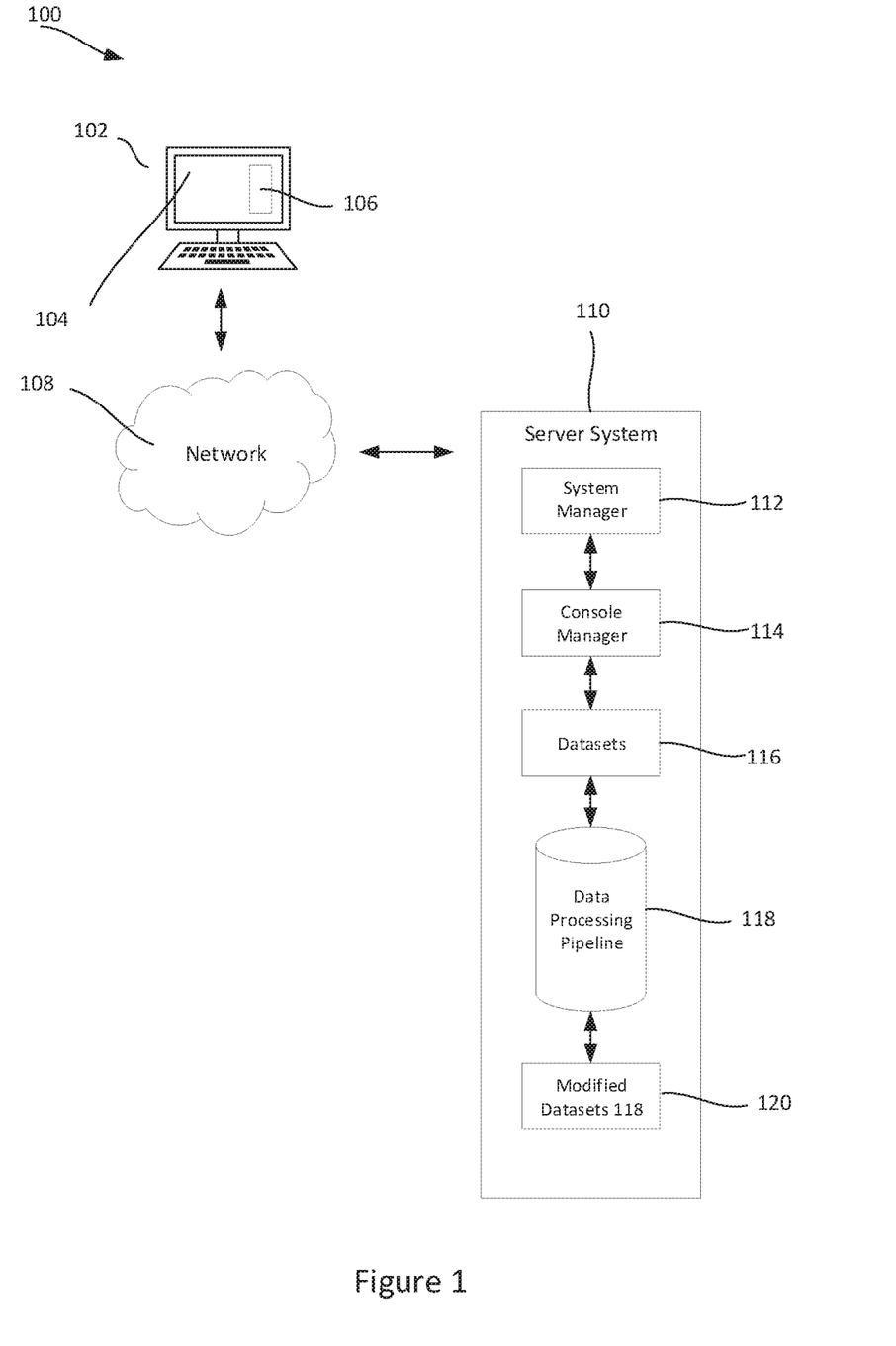
FIG. 1 shows a schematic example of a data pipeline.

FIG. 1 shows a schematic example of a data analysis system. The system illustrated provides an example of a system for implementing the methods described herein, though the skilled person will recognize that the methods described herein may alternatively be implemented by other computing systems.

The system 100 comprises a user device 102, which provides a graphical user interface 106 through which a user can interact with datasets 1116 to create a data processing pipeline 118, producing modified datasets 120.

The user device 102 may for instance be a laptop computer, a desktop computer, a mobile phone, a personal digital assistant (PDA), a tablet computer, a netbook, a television with one or more processors, embedded therein or coupled thereto, a physical machine or a virtual machine. The user device 102 may include one or more of a keyboard, a mouse, a display 104, or a touch screen (of which display 104 may be a part of). For example, the user device 102 may be composed of hardware components like those of basic computing device 500 described below with respect to FIG. 5. The user device 102 may also include a web browser or a client application configured to display, in a user interface 106 of the client computing device 102 display 104, a computer program for performing data processing pipelines 118. Such a computer program may allow the user to indicate the datasets 116 for processing and where the modified dataset 120 should be stored. It may also allow the user to specify other operations that should be performed by the system manager 112. The user interface 106 may be a web browser window, a client application window, an operating system window, an integrated development environment window, a virtual terminal window or other computer graphical user interface window.

The system comprises a server system 110 which communicates with the user device via a network 108. The network 108 may include the Internet, an intranet, a local area network, a wide area network, and a virtual private network (VPN). For ease of understanding, various components of the system have each been described with reference to one or more computing devices. It should be noted that, in some embodiments, any number of components may be collocated on the same computing device.

The server system 110 may include a system manager 112 which is capable of receiving commands for a data processing pipeline 118 from a user device 102 and requesting that the system manager 112 perform the data processing pipeline 118. The server system 110 is advantageously implemented as multiple server computing devices arranged in a distributed or clustered computing arrangement. Each such server computing device may be composed of hardware components like those of basic computing device 500 described below with respect to FIG. 5.

The server system 110 may include a console manager 114 which receives commands entered into a console in the user interface 106. The console manager 114 configures the system manager 112 to perform the data processing pipeline 118 in accordance with the commands entered into the user interface 106. Although the console manager 114 is described herein as a component of the server system 110, it will be appreciated that the console manager may be included in the user device 102.

The server system 110 may include one or more processors (e.g., CPUs), a network interface, and memory. The processor(s) may be configured to execute computer instructions that are stored in one or more computer-readable media, for example, the memory of the server system 110. The server system 110 may include a network interface that is configured to allow the server system 110 to transmit and receive data in a network, e.g., network 108 of FIG. 1. The network interface may include one or more network interface cards (NICs). The memory of the server system 110 may store data or instructions. The instructions stored in the memory may include the data pipeline 118.

Figure 2:
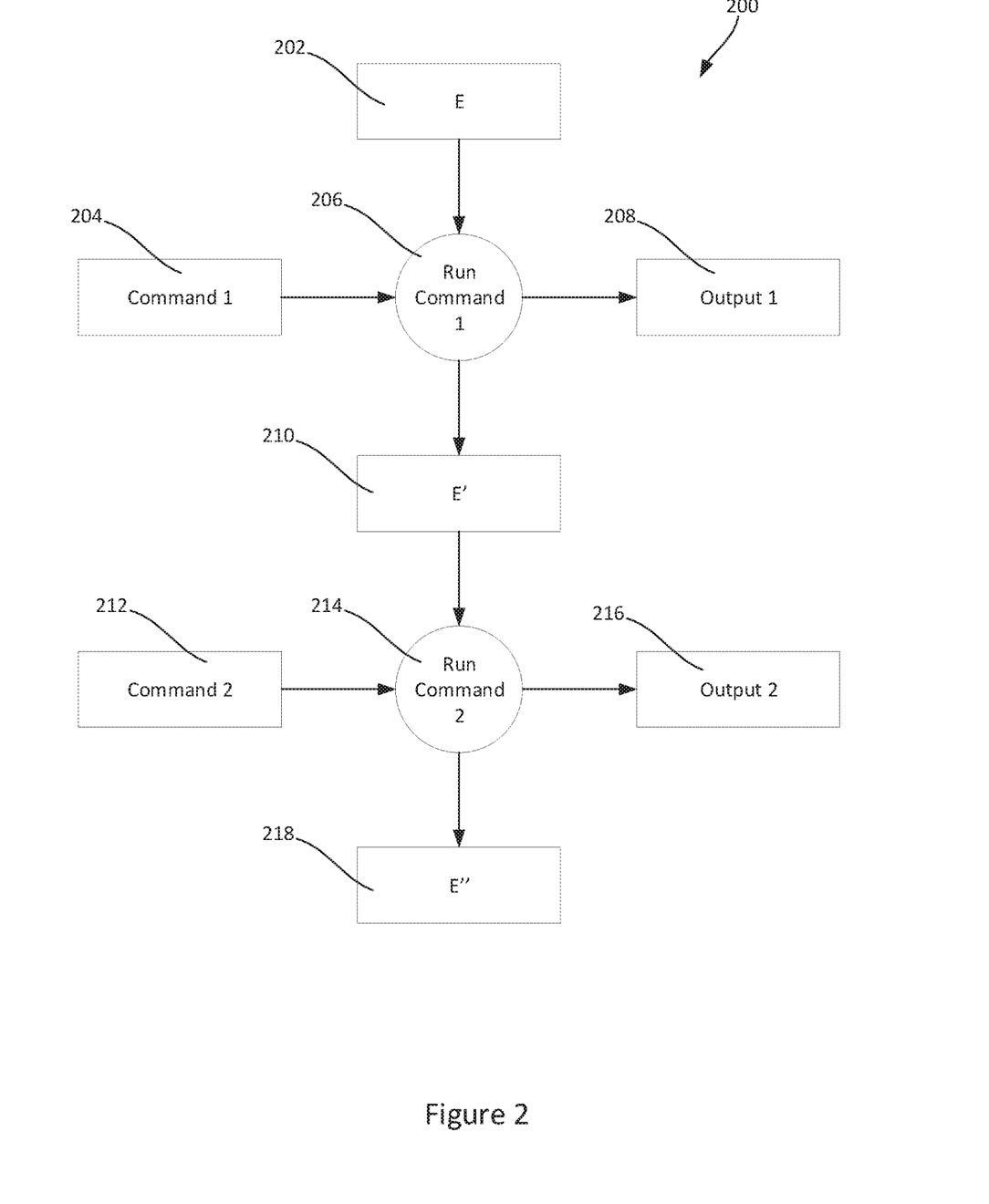
FIG. 2 shows a schematic example of a data pipeline being constructed in a console environment.

FIG. 2 shows a schematic example of a data pipeline being constructed in a console environment.

FIG. 2 is shown in the context of a console session 200, wherein a user defines variables and/or runs commands relating to the defined variables using the graphical user interface 106. Variables may also be loaded from memory. Running a command through the console may result in producing a newly defined variable, or may result in modifying an existing variable. Typically, in the context of a console session, the commands are individual lines of code. The lines of code may result in the modification of one or more variables, and/or the creation/definition of one or more variables. This may be performed in an interactive manner, wherein the output of a command is displayed on the graphical user interface 106 in response to the command.

The defined variables may include datasets. Alternatively or additionally, they may include objects with types commonly found in various programming languages. For example, the object type may be a list, a dictionary, a string, a number, or a file. Commands relating to the defined variables may include various transformations typically performed on datasets. These commands may include join operations, filter operations, and more general column or row transformations. Alternatively or additionally, commands may include mathematical operations performed on numbers (e.g. addition, subtraction, multiplication), and string operations performed on strings (e.g. separation, joining, capitalization). Typically, in the context of a console session, the commands are single lines of code, wherein either a single variable is modified, or a single variable is defined.

The environment 202 describes the current state of the variables. These variables may have been defined by the user, may be a result of previously running commands in the same session, and/or may be loaded from memory. For example, the environment may be represented as a dictionary with the names of the variables as keys. Corresponding values to the keys may be the value of the variable. For example, if a user defines "a=7" during a console session, the corresponding key-value pair may be {"a":7}. Alternatively or additionally, the value may be a hashed representation of the variable. Thus if "hash(obj)" is a function for generating hash values for an object, the corresponding entry for the above example may be {"a":hash(a)}.

The environment 202 is implemented as a "console namespace". The console namespace supplements a dictionary namespace with a set of environmental flags for indicating lines in the console session at which variables in the environment have been accessed and/or modified. When a variable is accessed or modified through the console session, the set of environmental flags is updated to indicate the line at which the access and/or modification of that variable occurred.

A run command 206 is an instruction input by a user to perform the command 204. The command 204 and run command 206 are received by the system manager 112 which performs the desired command 204, produces an output 208 and updates/creates variables as required by the command 204. The output may, for example, be a data frame. The command 204 is also received by the console manager 114. The console manager may use the command to update the environment 202 and/or to track line dependencies of variables, as described in further detail with respect to FIG. 3. By tracking the line dependencies of variables in the environment, data pipelines are effectively inferred from the console log.

As a result of the system manager 112 performing the command 204 and producing an output 208, the environment 202 is updated. Variables that are modified may have their value updated in the environment to the modified value, for example in the same manner as a standard dictionary namespace. For example, if the command 204 is "a=a+1", then the previous dictionary representations of the variable "a" are no longer valid. Both the value of "a" and, where appropriate, the hashed representation of "a" are changed. The new values of these variables are updated in the dictionary. The console manager 114 is configured to modify the dictionary representation of the environment 202 in response to a run command 206, producing the new valid environment 210.

Variables that are accessed and/or modified during execution of the command 204 are flagged using the set of environmental flags in the console namespace. Once the command has been executed, the console namespace is used to determine which variables have been accessed and/or modified by the command, and the command line for that command is associated with environmental flags indicating which variables have been accessed and/or modified.

Using currently valid environment 210, the above steps may be repeated in response to a new command 212, run command 214. The system manager 112 may produce a further output 216 in response to the run command. As described above, the console manager may then modify the previous environment 210 to produce the new valid environment 218.

The result over multiple commands is that, for each line in the console session, the console namespace indicates, via the environmental flags, which variables have been accessed at that line and a subset of the accessed variables that have been modified at that line.

The environmental flags created in this way can be used by the console session to track the dependencies between lines. Whenever a variable is accessed using a command at a particular line in the console session, a dependency is created to the last line at which that variable was modified by using the environmental flags. Line dependencies may be stored in a set of line dependencies in the console session. Calculation of the line dependencies may be referred to herein as "waypoint calculation". The waypoint calculation is described in more detail with reference to FIG. 3.

Elements of the console session will now be described in further detail. The console session in which the commands are executed may be referred to as a "smart console" environment that defines the environment in which the data transformation commands are executed.

The smart console environment may comprise the console namespace. The console namespace comprises a dictionary and a set of environmental flags that can be used to determine which variables have been accessed in the console session and/or which variables have been modified during the console session. The console namespace tracks variables which are accessed and or modified, as well as the current values of the variable used in the session.

In some embodiments, each line of the console session is associated with a set of line environmental flags in the namespace. Each set of line environmental flags comprises an indication of the variables that were accessed at the associated line in the console session. Each set of environmental flags further comprises an indication of which accessed variables have been modified in by the data transformation command input at that line.

The smart console environment further comprises a set of line dependencies that represent the dependency of the commands executed at lines in the console session on the previously executed commands in said console session. Each line in the console is associated with a set of line numbers identifying previous lines in the console which were used to when executing the command input at that line (i.e. the output generated by the command on line "x" depends on previous lines "y" and "z"). The line dependencies are updated during a calculate waypoint operation. The calculate waypoint operation may be performed after the execution of each command in the console.

As an example, line_dependencies[11]=[3,7] indicates that the command input at line number 11 depends on the commands input at line number 3 and line number 7. It will be appreciated that some console lines may not depend on any previous lines. Such lines may appear in the set of line dependencies with no dependency indicated, or alternatively may be omitted from the set of line dependencies altogether.

In addition to the console namespace, the smart console environment may comprise a list of all the commands executed in the console session so far. The history comprises a list of console line numbers, each with the associated command entered at that console line.

The smart console environment may comprise a set of external dependencies. The set of external dependencies identifies the dependency of lines in the console session on external data sources.

The smart console environment may comprise a set of variable modification flags. The variable modification flags indicate, for each variable in the current scope, the line number of the last line in the console session at which said variable was modified.

Figure 3:
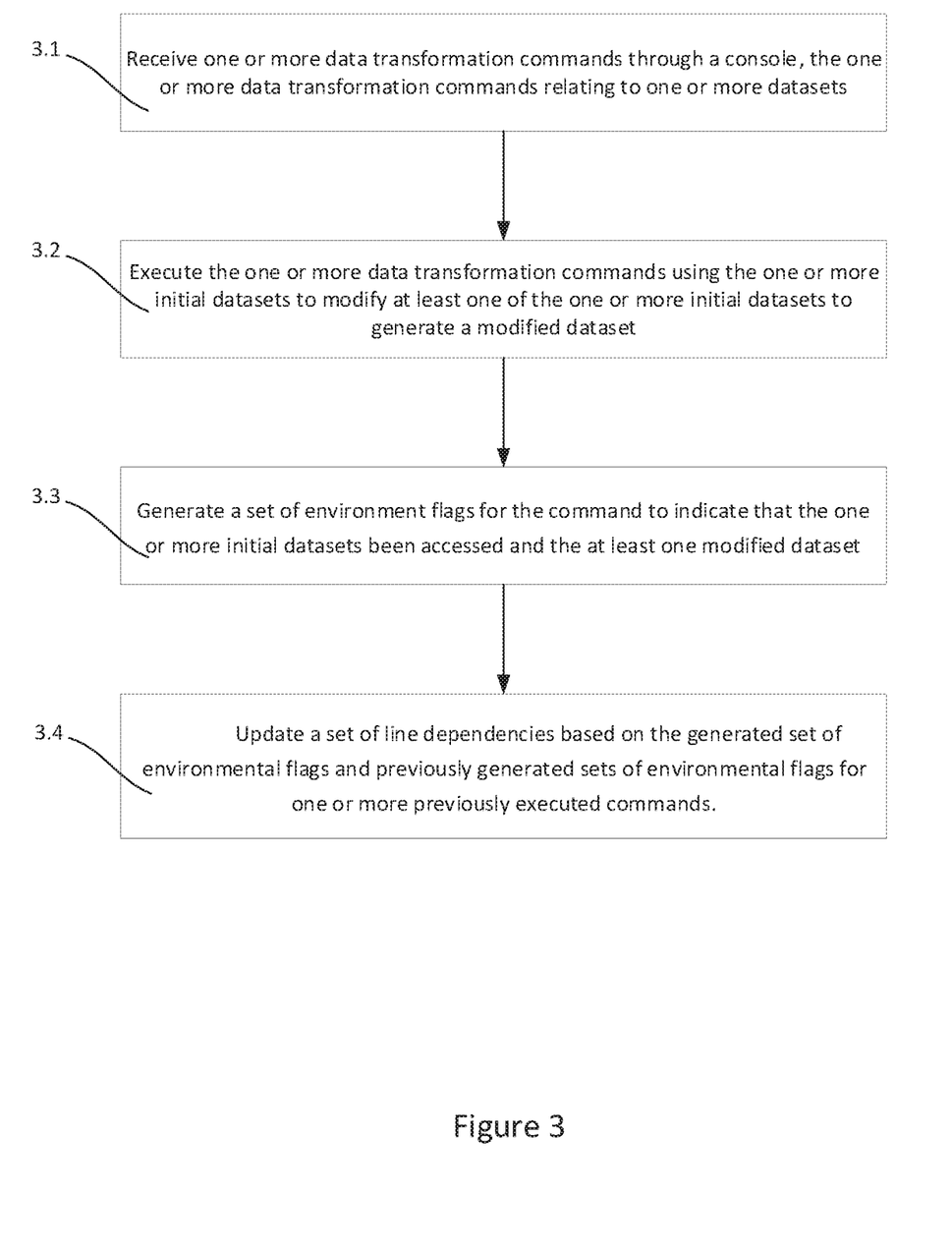
FIG. 3 shows a flow diagram of an example method of constructing a data pipeline in a console environment.

FIG. 3 shows a flow diagram of an example method of constructing a data pipeline in a console session.

At operation 3.1, one or more data transformation commands are received through a console. The one or more data transformation commands relate to one or more one or more datasets. The console line into which the one or more data transformation commands is input is referred to in the following as "the current line". Data transformation commands entered and executed at previous lines are referred to in the following as "previously executed data transformation commands".

The user inputs one or more data transformation commands into the console at the current line in the form of typed code (i.e. via a command line interface). The data transformation commands comprise one or more operations on datasets. Transformations on datasets may comprise, but are not limited to, join operations, filter operations, and more general column or row transformations. Alternatively or additionally, commands may include mathematical operations performed on numbers (e.g. addition, subtraction, multiplication), and string operations performed on strings (e.g. separation, joining, capitalization).

The datasets may be raw datasets, and/or datasets derived from the application of one or more data transformations to raw datasets.

At operation 3.2, the one or more data transformation commands are executed using the previously modified dataset to modify at least one of the one or more datasets related to the data transformation command.

Variables/datasets in the data transformation commands input in the current line are identified and retrieved from the console namespace. Their current values are used to execute the data transformation command. Executing the one or more data transformation commands may comprise generating a data frame object.

Once the data transformation command has been executed, any variables/datasets modified by the data transformation command have their values updated in the console namespace to their modified value.

At operation 3.3, a set of environment flags for the command is generated to indicate that the one or more datasets related to the data transformation command have been accessed. The environmental flags are further updated to indicate which of the accessed datasets has been modified by the command.

The variables/datasets accessed in the execution of the data transformation command are determined, and each accessed variable is flagged in the console namespace. The flags may comprise the current line's line number and a list of the variables accessed during the execution of the data transformation command.

The variables/datasets modified in the execution of the data transformation command are determined, and each modified variable is flagged in the console namespace. Determining which variables/datasets have been modified may comprise comparing the value of a variable after the execution of the data command to the value of the variable prior to the execution of the data command (which may be temporarily stored for the purpose of the comparison).

In some embodiments, determining which variables/datasets have been modified may comprise comparing a hash of the variable/dataset after the execution of the data transformation command to a hash of the variable prior to the execution of the data transformation command. If the hashes are different, it is determined that the variable/dataset has been modified. The hash values of variables may be stored in the smart console environment. The stored hash values may be updated after the comparison with the previous hash values has been performed if a modification is detected (i.e. if the hash value of a variable/dataset after the execution of the data transformation command differs from the previous hash value for that variable/dataset).

In some embodiments, the variable/dataset may not be in a form that is hashable, for example being in the form of a table. In these embodiments, one or more transformation may first be applied to the variable/dataset to transform it into a hashable form. For example, the variable/dataset may undergo a Pickle or cPickle to transform it to a hashable form.

In embodiments where the variable/dataset is a table, the elements of the table may be individually hashed and then summed to generate the hashed value of the dataset (i.e. hashing the one or more accessed datasets comprises summing hashes of the plurality of data elements in the table).

At operation 3.4, a set of line dependencies is updated based on the generated set of environmental flags and previously generated sets of environmental flags for one or more previously executed commands.

In some embodiments, updating the set of line dependencies comprises performing a waypoint calculation. Determining a waypoint comprises determining which of the variables in the data transformation command were accessed when running the data transformation command. In some embodiments, the environmental flags are used to determine which variables have been accessed. For each variable that is determined to have been accessed, the environmental flags from previously executed commands are searched to determine the last line in the console session in which that variable was modified. A line dependency is then created between the current line and the identified previous line.

In effect, whenever a data transformation command is input into a line of the console session, a dependency of that line is created to the last line/lines that at which the variables in the data command were modified. From a list of the line dependencies of each command input into the console session, a data pipeline can be inferred from the console session, i.e. the list of line dependencies can be used to determine a dependency graph of the data transformations in the console session.

In some embodiments, the method further comprise updating the set of variable modification flags to indicate that the one or more modified datasets were last modified on the current line of the console session.

Figure 4:
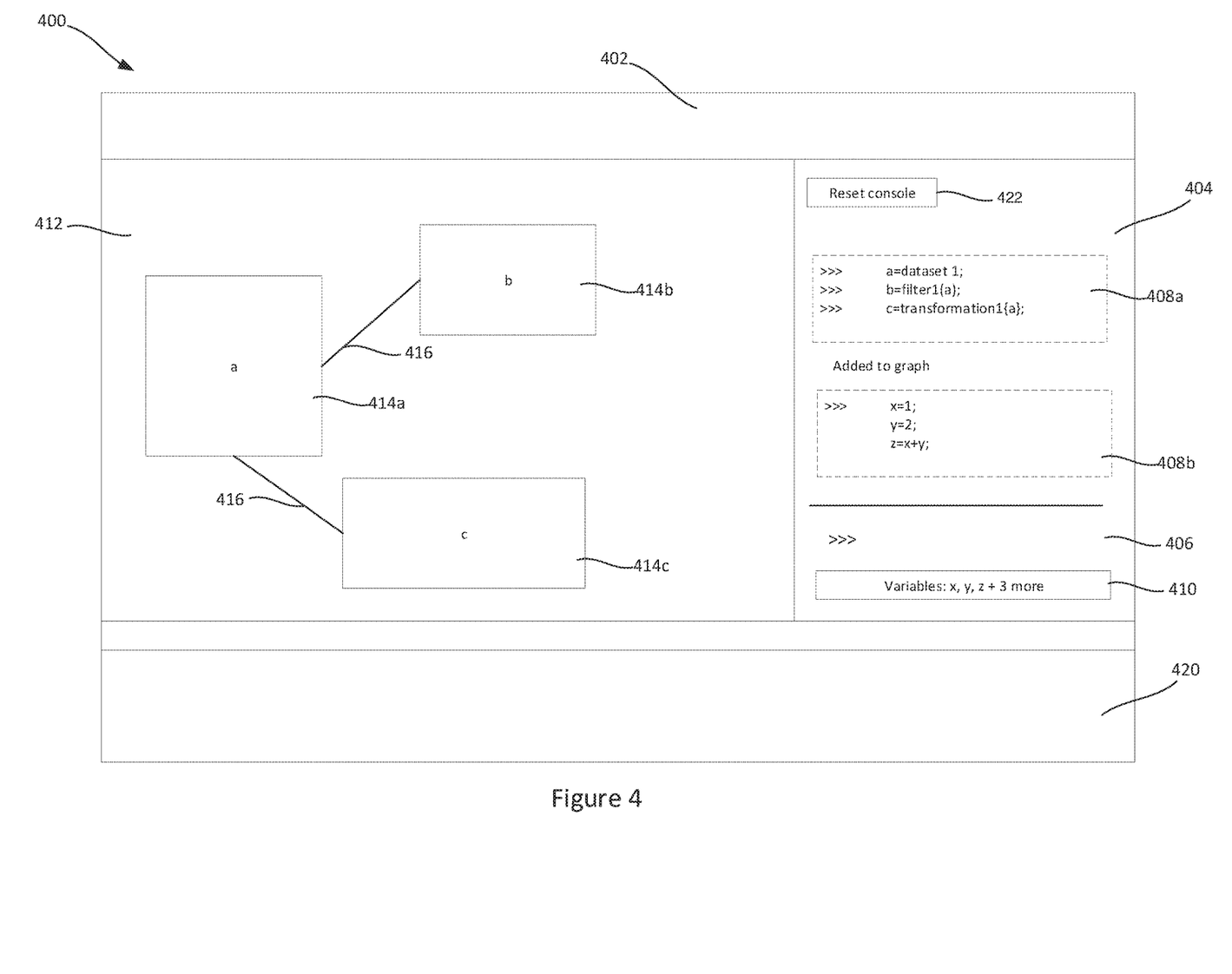
FIG. 4 shows an example of a user interface for constructing a data pipeline in a console environment.

FIG. 4 shows an example of a user interface for constructing a data pipeline in a console environment. The user interface 400 may be provided through a display of the user device 102.

The user interface 400 comprises a toolbar 402. The toolbar may provide one or more operations that can be performed on the data pipeline being created through the user interface. The toolbar 402 may provide file management operations, such as saving the file, opening a new file, opening a previously stored file etc.

The user interface further comprises a command line interface 404 (i.e. an interface to the smart console). The command line interface 404 facilitates the entry of data transformation commands 408a-b in the form of text. The command line interface comprises a current line 406 into which a data transformation command may be entered in the form of text. Once entered a run command may be received to execute the data transformation command. The run command may, for example, be received via a keyboard (e.g. pressing a run key, such as the enter/return key) and/or through an icon/button on the user interface (not shown).

The command line interface 404 may further comprise one or more previous lines into which previous data transformation commands 408a-b have been entered and then executed.

The command line interface may further comprise a variables list 410 indicating the variables/datasets currently in the console namespace. The variable list 410 may not show all the variables in the namespace due to size limitations. Hovering a cursor over the variable list 410 and/or selecting the variable list 410 through the user interface may display a full list of the variables in the console namespace.

The command line interface 404 may further comprise "reset console" button 422 The reset console button 422 is operable to reset the console session 404 and/or console 412, i.e. to clear the namespace and/or reset/delete the variables in the namespace.

The user interface 400 may further comprise an interactive data transformation graph 412. The interactive data transformation graph 412 may be used to perform data transformation commands on datasets as an alternative to the command line interface 404. It may also display a dependency graph of the data pipeline input through the console 412 (i.e. the data pipeline inferred from the line dependencies of the console session determined using the methods described herein).

In the example shown, a variable "a" has been defined in the console session in the set of commands 408a as a particular dataset. This variable is illustrated in the data transformation graph 412 as a representation 414a, such as an object view. The object view may, for example, be a table. A variable "b" has been defined as a data transformation command on the variable a in the set of commands 408a (in this example a filter, though many other data operations are possible). This variable is illustrated in the data transformation graph 412 as a representation 414b, such as an object view, with a connection 416 to the representation of variable a 414a indicating that variable b depends on variable a. A further variable "c" has been defined as a second data transformation command on the variable a in the set of commands 408a. This variable is illustrated in the data transformation graph 412 as a representation 414c, such as an object view, with a connection 418 to the representation of variable a 414a indicating that variable c depends on variable a. The connections 416, 418 are inferred from the line dependencies of the console session.

It will be appreciated that a representation in the data transformation graph 412 may depend on one or more datasets, and thus may have a plurality of connections to those datasets illustrated. The data transformation graph 412 in effect shown the data pipeline created through the command line interface 404. The data pipeline may additionally be edited/managed through the data transformation graph 412 directly rather than using the command line interface 404.

The user interface 400 may further comprise a code editor window 420. The code editor window 420 allows a user to edit the data transformation graph 412 without having to reset the console 412 or undo console commands. When a user selects a representation 414a-c, code used to generate the variable associated with that representation may be displayed in the code editor window 420. The user may edit the code to change the code defining the variable, for example to redefine the variable and/or change the data transformation command used to generate the variable.

Figure 5:
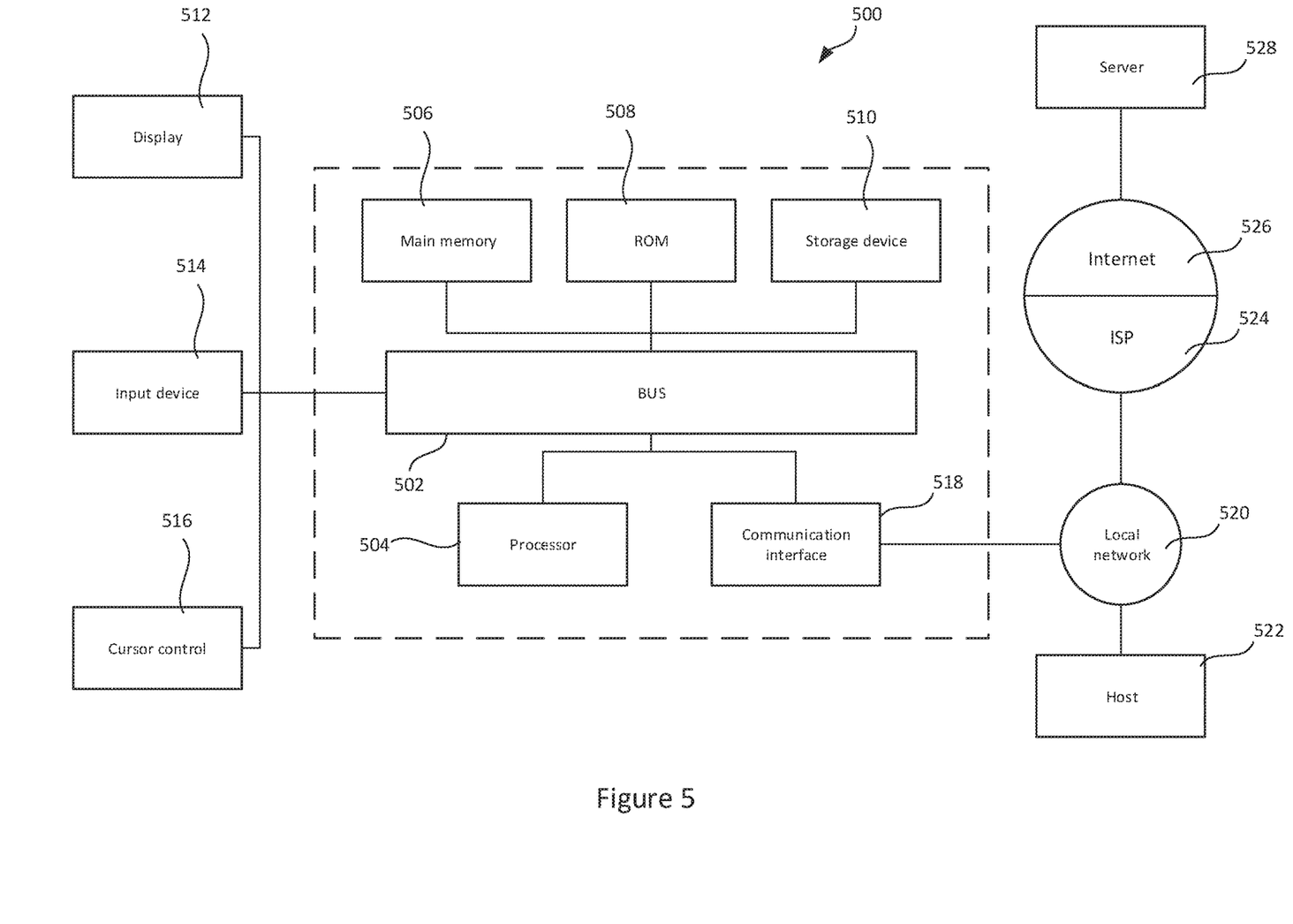
FIG. 5 shows a block diagram of an exemplary computer system.

Referring to FIG. 5, a block diagram of an exemplary computer system consistent with examples of the present specification is shown.

Computer system 500 includes a bus 502 or other communication mechanism for communicating information, and a hardware processor 504 coupled with bus for processing information. Hardware processor 504 can be, for example, a general purpose microprocessor. Hardware processor 504 comprises electrical circuitry.

Computer system 500 includes a main memory 506, such as a random access memory (RAM) or other dynamic storage device, which is coupled to the bus for storing information and instructions to be executed by processor. The main memory 506 can also be used for storing temporary variables or other intermediate information during execution of instructions by the processor 504. Such instructions, when stored in non-transitory storage media accessible to the processor, render the computer system 500 into a special-purpose machine that is customized to perform the operations specified in the instructions. The main memory 506 may be referred to as volatile memory.

Computer system 500 further includes a read only memory (ROM) 508 or other static storage device 510 coupled to the bus for storing static information and instructions for the processor 504. A storage device 510, such as a magnetic disk or optical disk, is provided and coupled to the bus for storing information and instructions.

Computer system 500 can be coupled via the bus to a display 512, such as a cathode ray tube (CRT), liquid crystal display, or touch screen, for displaying information to a user. An input device 514, including alphanumeric and other keys, is coupled to the bus 502 for communicating information and command selections to the processor 504. Another type of user input device is cursor control 516, for example using a mouse, a trackball, or cursor direction keys for communicating direction information and command selections to the processor and for controlling cursor movement on the display. The input device 516 typically has two degrees of freedom in two axes, a first axis (for example, x) and a second axis (for example, y), that allows the device to specify positions in a plane.

Computer system 500 can implement the techniques described herein using customized hard-wired logic, one or more ASICs or FPGAs, firmware and/or program logic which in combination with the computer system causes or programs computer system to be a special-purpose machine. According to some embodiments, the operations, functionalities, and techniques disclosed herein are performed by computer system in response to the processor executing one or more sequences of one or more instructions contained in the main memory. Such instructions can be read into the main memory from another storage medium, such as storage device. Execution of the sequences of instructions contained in main memory causes the processor to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus. Transmission media can also take the form of acoustic or light waves, such as those generated during radio-wave and infra-red data communications.

Various forms of media can be involved in carrying one or more sequences of one or more instructions to processor for execution. For example, the instructions can initially be carried on a magnetic disk or solid state drive of a remote computer. The remote computer can load the instructions into its dynamic memory and send the instructions over a telephone line or other transmission medium using a modem. A modem local to computer system can receive the data on the telephone line or other transmission medium and use an infra-red transmitter to convert the data to an infra-red signal. An infra-red detector can receive the data carried in the infra-red signal and appropriate circuitry can place the data on bus. Bus carries the data to the main memory, from which the processor retrieves and executes the instructions. The instructions received by the main memory can optionally be stored on the storage device either before or after execution by the processor.

Computer system also includes a communication interface 518 coupled to the bus 502. The communication interface provides a two-way data communication coupling to a network link that is connected to a local network 520. For example, the communication interface can be an integrated services digital network (ISDN) card, cable modem, satellite modem, or a modem to provide a data communication connection to a corresponding type of telephone line. As another example, the communication interface 518 can be a local area network (LAN) card to provide a data communication connection to a compatible LAN. Wireless links can also be implemented. In any such implementation, the communication interface 518 sends and receives electrical, electromagnetic or optical signals that carry digital data streams representing various types of information.

The network link typically provides data communication through one or more networks to other data devices. For example, the network link can provide a connection through the local network 520 to a host computer 522 or to data equipment operated by an Internet Service Provider (ISP) 524. The ISP 524 in turn provides data communication services through the world wide packet data communication network now commonly referred to as the "Internet" 526. The local network 520 and internet 526 both use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), network link and communication interface. For example, a first application server may transmit data through the local network to a different application server 528.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

It will be appreciated that many modifications may be made to the embodiments hereinbefore described. Such modifications may involve equivalent and other features which are already known in automated monitoring and control of machinery, and which may be used instead of or in addition to features already described herein. Features of one embodiment may be replaced or supplemented by features of another embodiment.

In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although claims have been formulated in this application to particular combinations of features, it should be understood that the scope of the disclosure of the present disclosure also includes any novel features or any novel combination of features disclosed herein either explicitly or implicitly or any generalization thereof, whether or not it relates to the same disclosure as presently claimed in any claim and whether or not it mitigates any or all of the same technical problems as does the present disclosure.

The invention claimed is:

1. A method performed by one or more processors, the method comprising:

receiving one or more data transformation commands through a console in a console session, the one or more data transformation commands relating to one or more initial datasets;

executing the one or more data transformation commands using the one or more initial datasets to modify at least one of the one or more initial datasets to generate a modified dataset;

hashing one or more of accessed datasets after executing the data transformation commands to generate current hashed values of the one or more accessed datasets;

comparing the current hashed values of the accessed one or more datasets to hashed values of the one or more initial datasets to determine which of the one or more accessed datasets was modified by the data transformation commands;

generating a set of environment flags for the data transformation commands to indicate that the one or more initial datasets has been accessed and the at least one dataset that has been modified; and updating a set of line dependencies based on the generated set of environmental flags and previously generated sets of environmental flags for one or more previously executed commands.

2. The method of claim 1, wherein updating the set of line dependencies comprises:

determining which initial datasets were accessed during execution of the data transformation command; and for each accessed dataset, searching the previously generated sets of environmental flags to find a last previously executed command at which said accessed dataset was modified.

3. The method of claim 1, wherein the one or more accessed datasets comprises a plurality of data elements, and hashing the one or more accessed datasets comprises summing hashes of the plurality of data elements.

4. The method of claim 1, further comprising updating a variable access list based on the environmental flags, wherein the environmental access list comprises a set of dataset identities corresponding to one or more datasets, and an associated line number for each dataset indicating a line of the console session on which said dataset was last modified.

5. The method of claim 1, wherein the list of line dependencies is used to infer a data pipeline.

6. The method of claim 1, wherein executing the one or more data transformation commands comprises generating a data frame.

7. The method of claim 1, wherein the data transformation command comprises one or more of: a join operation, a filter operation, a more general column and/or row transformation; mathematical operations performed on numbers; and/or string operations performed on strings.

8. The method of claim 1, wherein the one or more initial datasets comprises: a list; a table; an object; a dictionary; a string; a number; or a file.

9. A non-transitory computer readable medium having computer readable code stored thereon, the computer readable code, when executed by at least one processor of a computing device, causing performance of the steps of:

receiving one or more data transformation commands through a console in a console session, the one or more data transformation commands relating to one or more initial datasets;

executing the one or more data transformation commands using the one or more initial datasets to modify at least one of the one or more initial datasets to generate a modified dataset;

hashing one or more of accessed datasets after executing the data transformation commands to generate current hashed values of the one or more accessed datasets;

comparing the current hashed values of the accessed one or more datasets to hashed values of the one or more initial datasets to determine which of the one or more accessed datasets was modified by the data transformation commands;

generating a set of environment flags for the data transformation commands to indicate that the one or more initial datasets has been accessed and the at least one dataset that has been modified; and updating a set of line dependencies based on the generated set of environmental flags and previously generated sets of environmental flags for one or more previously executed commands.

10. The non-transitory computer readable medium of claim 9, wherein updating the set of line dependencies further causes performance of the steps of:

determining which initial datasets were accessed during execution of the data transformation command; and for each accessed dataset, searching the previously generated sets of environmental flags to find a last previously executed command at which said accessed dataset was modified.

11. The non-transitory computer readable medium of claim 9, wherein the one or more accessed datasets comprises a plurality of data elements, and hashing the one or more accessed datasets comprises summing hashes of the plurality of data elements.

12. A system comprising:

one or more processors; and a memory, the comprising computer readable instructions that, when executed by the one or more processors, cause the system to perform:

receiving one or more data transformation commands through a console in a console session, the one or more data transformation commands relating to one or more initial datasets;

executing the one or more data transformation commands using the one or more initial datasets to modify at least one of the one or more initial datasets to generate a modified dataset;

hashing one or more of accessed datasets after executing the data transformation commands to generate current hashed values of the one or more accessed datasets;

comparing the current hashed values of the accessed one or more datasets to hashed values of the one or more initial datasets to determine which of the one or more accessed datasets was modified by the data transformation commands;

generating a set of environment flags for the data transformation commands to indicate that the one or more initial datasets has been accessed and the at least one dataset that has been modified; and updating a set of line dependencies based on the generated set of environmental flags and previously generated sets of environmental flags for one or more previously executed commands.

13. The system of claim 12, wherein updating the set of line dependencies further cause the system to perform:

determining which initial datasets were accessed during execution of the data transformation command; and for each accessed dataset, searching the previously generated sets of environmental flags to find a last previously executed command at which said accessed dataset was modified.

14. The system of claim 12, wherein the one or more accessed datasets comprises a plurality of data elements, and hashing the one or more accessed datasets comprises summing hashes of the plurality of data elements.

* * * * *